US006820439B1

United States Patent
Marek

(10) Patent No.: US 6,820,439 B1
(45) Date of Patent: Nov. 23, 2004

(54) STRUCTURE COOLING SYSTEM

(76) Inventor: Raymond G. Marek, 5770 Winfield Blvd., SPC 160, San Jose, CA (US) 95123

( * ) Notice: Subject to any disclaimer, the term of this patent is extended or adjusted under 35 U.S.C. 154(b) by 0 days.

(21) Appl. No.: 10/712,694

(22) Filed: Nov. 12, 2003

(51) Int. Cl.[7] ............................................. F25D 23/12
(52) U.S. Cl. ...................................... 62/259.4; 62/171
(58) Field of Search ............................... 62/171, 259.4, 62/373, 261, 304

(56) References Cited

U.S. PATENT DOCUMENTS

| 1,808,829 | A | | 6/1931 | Barnes | |
|---|---|---|---|---|---|
| 2,266,321 | A | | 12/1941 | Holder | ............................. 62/6 |
| 2,660,863 | A | | 12/1953 | Gerhart, Jr. | ...................... 62/6 |
| 3,563,305 | A | | 2/1971 | Hay | .............................. 165/2 |
| 3,668,287 | A | * | 6/1972 | Mackie | ...................... 264/45.2 |
| 4,064,706 | A | * | 12/1977 | Stephens, Jr. | .................. 62/64 |
| 4,355,682 | A | | 10/1982 | Maloney | ...................... 165/48 |
| 4,761,965 | A | * | 8/1988 | Viner | ........................... 62/171 |
| 5,070,933 | A | | 12/1991 | Baer | ............................. 165/32 |
| 5,174,128 | A | * | 12/1992 | Bourne et al. | ................. 62/373 |
| 6,250,091 | B1 | | 6/2001 | Jerome | ......................... 62/171 |
| 6,367,275 | B1 | | 4/2002 | Stephan | ..................... 62/259.1 |
| 6,575,234 | B2 | | 6/2003 | Nelson | ........................ 165/247 |

FOREIGN PATENT DOCUMENTS

JP         406185131 A   *  7/1994  ................. 239/398

* cited by examiner

Primary Examiner—Melvin Jones
(74) Attorney, Agent, or Firm—Thomas Schneck; David M. Schneck

(57) ABSTRACT

A system for cooling a structure exposed to solar radiation. The system includes a polymeric sheet covering one or more exterior surfaces of the structure. A water dispensing means associated with the sheet provides a flow of water across the sheet to wet the sheet, allowing evaporative cooling to take place. The color and construction of the sheet also provide for insulation against ambient heat and reflection of some solar energy. A sensor detecting an environmental condition, such as roof temperature or sheet wetting, may activate water flow by actuating a valve.

17 Claims, 2 Drawing Sheets

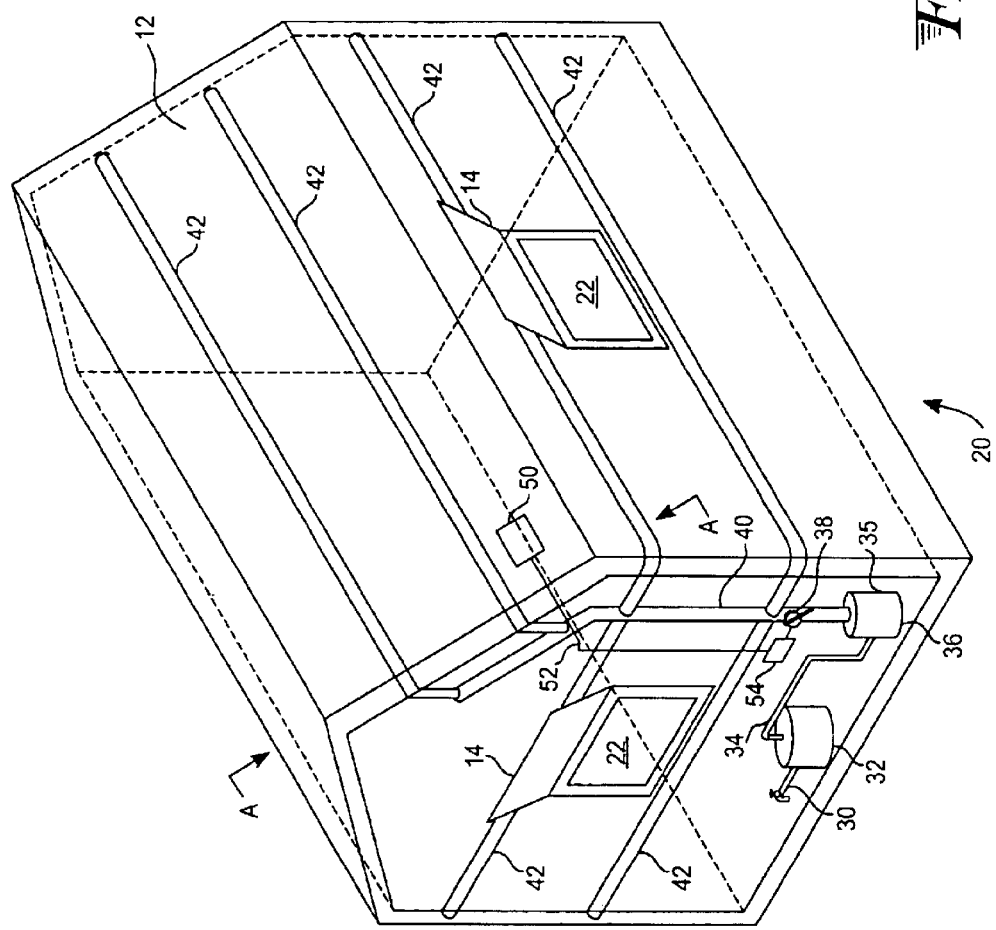
Fig._1

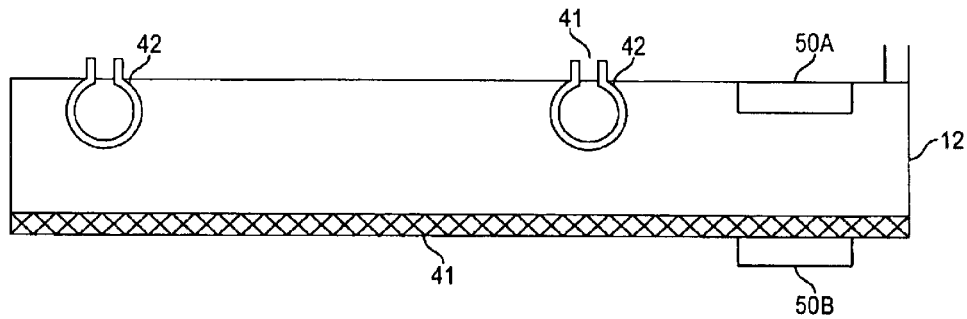
Fig._2
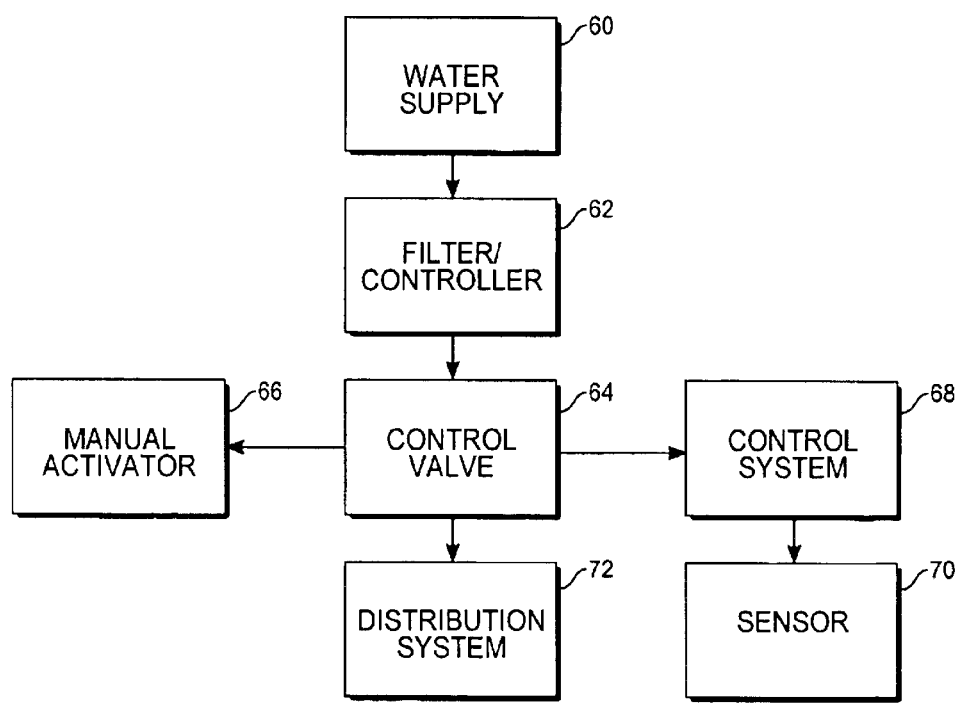
Fig._3

STRUCTURE COOLING SYSTEM

TECHNICAL FIELD

The present invention relates to a cooling system and more specifically relates to an evaporative cooling system on the exterior of a structure to radiate away solar heat.

BACKGROUND OF THE INVENTION

All of the references mentioned below are incorporated by reference herein.

Numerous systems and considerable energy resources have been used to regulate the temperature within buildings and other structures. The cost of electricity for such systems is quite considerable. In many homes, an area below the roof joists and the interior ceiling acts to contain air heated by the solar radiation impinging upon a roof. The air contained within this space is vented from side vents of the interior space. Additional insulation on the ceiling acts to reduce heat transfer from this space. However, a number of structures do not have such spaces between the ceiling and the roof of the structure or such spaces are minimal. Such structures include mobile and manufactured homes. Many of these types of buildings have vaulted ceilings with minimal space between the interior ceiling and the roof.

A number of air conditioning devices have been developed to cool interior of structures. Such devices are generally heat pumps that introduce cool air into a room. Given the cost of operating such air conditions, an alternative of supplementary means for cooling structures is desirable.

In addition to insulating a ceiling space, cooling a roof has been proposed as a means to reduce temperature within a structure.

U.S. Pat. No. 1,808,829 to Barnes discloses the use of a fabric such as burlap or canvas for evaporative cooling of a building. The fabric is positioned on a building's roof and is wetted. The water is allowed to evaporate, cooling the structure. This method has certain drawbacks however. The material used could be damaged by wind or degraded by rotting or rodent infestation. In addition, no automated application of the water is provided. Such a system would require constant monitoring to ensure the fabric remained wet.

U.S. Pat. No. 2,266,321 to Holder discloses a network of pipes through which water may be directed onto a roof surface. An automatic valve linked to a heat sensor regulates flow of water. The heat sensor is enclosed in a vented enclosure mounted on the roof. A thermal expansion within the bulb creates a pressure that actuates the valve controlling the dispensing of water throughout the pipes. The pipes extend over the surface of the roof and have spray heads to distribute the water.

U.S. Pat. No. 2,660,863 to Gerhart discloses a system for evaporative cooling of a structure surface using a porous hose, such as a canvas tube, to apply water over a time interval to a roof surface. The tube is positioned near the apex of the roof allowing water to drip down over the surface of the roof. Water that travels over the roof to the edge of the roof without evaporating is collected from the gutters at the edge of the roof. This water returns to a storage location for reapplication to the roof surface. The canvas hose may be subject to environmental decay.

U.S. Pat. No. 4,761,965 to Viner discloses a network of roof water pipes having periodic nozzles for applying a spray of water in a uniform manner over the surface of a roof. The sprayed water evaporates to cool the roof. An electronic temperature sensor measures the roof temperature. When the roof temperature rises above a temperature set point, the spray system is activated. The system includes a pressure regulator to ensure proper water pressure level at the nozzles. This controls and regulates the spray pattern. The control system also applies the water by activating the valves at cycled periodic intervals. This ensures more even temperature regulation of the roof surface.

U.S. Pat. No. 6,250,091 to Jerome discloses another similar system for cooling a building. In this system, a network of delivery water pipes extends across a roof surface. A number of spray nozzles are periodically disposed along the pipe length. A number of sensors measure the temperature of the roof. In addition, sensors measure the moisture remaining on the roof. The sensors are joined to electrically operated valves that apply the water at desired intervals. The nozzles are operated in sequence to reduce the water pressure required for operation of the spray nozzles. The array of nozzles are segregated into a number of defined areas. In each area a valve controls water flow. The valve is actuated in response to signals from separate moisture and temperature sensors. In this manner, if one area of a building receives an increased amount of solar energy, the system will compensate by spraying additional water on that area.

U.S. Pat. No. 6,367,275 to Stephan discloses a method of evaporative cooling using a mixture of cement and aluminum powder. The concrete is placed on the roof and water is applied to allow for evaporative cooling. The concrete is applied in a 3 to 6 cm thickness and adds considerable weight to the roof. In addition, the concrete pour may only be done on flat roofs.

A number of the prior evaporative cooling systems share certain drawbacks. None of the prior art systems effectively act as a barrier to solar radiation impinging on the exterior surface of a building, such as a roof or exterior wall area. Such devices cannot have an insulating effect. In addition, these systems will not reflect solar energy. Because the total solar energy is still hitting the roof, additional water or other cooling will be required to dispel this absorbed energy.

The use of a thermostat on a roof on which the sun impinges is also problematic. The thermostat or other temperature-sensing device will be heated by the air and will be difficult to thermally isolate. In addition, it will in many cases be difficult to attach the thermostat to a roof surface such that efficient heat transfer from the roof allows measurement of roof temperature. For example, the surface of wood shingle roofs is highly variable. On such a roof it would be difficult to form an epoxy bond with this porous and variable surface. Temperatures measured by the thermostat on any surface may not accurately measure roof temperature and may instead measure the ambient air temperature, which may be considerably warmer or cooler than the roof.

Systems having moisture sensors also have potential drawbacks. Such a system would attempt to regulate temperature using moisture measurement, an indirect measurement method. On a dry, cloudy, windy day during conditions of low humidity, a moisture sensor for detecting moisture of the roof could activate the system even if the roof were cool.

Systems having large numbers of sensors and electronics are expensive and multiply the risk of some element of the system breaking down.

Spray application of water is also potentially problematic. Greater water pressure is required to spray the water with sufficient force to atomize the water into droplets and propel the droplets over a roof area. Such distribution of water over the roof is bound to be uneven due to gravitational forces. Because roof pitch will vary from structure to structure, spray applicators will also have to be altered to accommodate steeper roofs. The use of spray systems on sheer walls is unlikely to evenly apply water. In addition, some water of the spray will be evaporated prior to contacting the building exterior. The effects of such evaporation in cooling the roof will be minimal. Also, wind can blow the spray, changing the application pattern on the roof and requiring additional application of water. Such spray nozzles can clog, requiring maintenance.

SUMMARY OF THE INVENTION

The present invention is a system for cooling a structure. The system includes a polymeric sheet for covering an area of the exterior of the structure, such as a wall or roof section. Integral with the polymeric sheet is a water distribution system that allows wetting of the sheet. The water distribution system (such as a series of drip lines) is joined to a water supply tube linked to the water supply for the structure. A valve regulates water flow through the supply tube to the distribution system. A sensor associated with the sheet senses an environmental parameter, such as moisture in the sheet or temperature between the sheet and the roof. The sensor electrically signals the control system that operates the valve. When the roof temperature reaches a selected temperature, the valve is actuated and water flows to the distribution system. Alternatively, when the sheet becomes dry, the valve may be activated.

A number of different embodiments and implementation of this system are possible. The polymeric sheet may include features that reflect solar energy. The upper side of the sheet upon which solar radiation impinges may be selected to reflect solar radiation. Any color that reflects more solar energy than the original building surface is suitable, including light colors and gray. White would be an efficient reflective surface, as would a metallic mirroring surface, such as would be obtainable by using Mylar®. This would reflect considerable solar radiation.

The system would also include a means for attaching the sheet to the surface of the structure to prevent the sheet from blowing off. The sheet may be secured by a network of lateral and transverse cables that are attached at the apex and edges of the roof or wall. An alternative could be the use of a mesh material such as plastic netting affixed to the bottom of the polymeric sheet of material. This mesh could be attached to the edges of a roof or wall of the structure.

BRIEF DESCRIPTION OF THE DRAWINGS

FIG. 1 is a perspective view of a building on which the evaporative cooling system of the present invention has been installed.

FIG. 2 is a cross section along lines A of FIG. 1 showing a cross section of the polymeric sheet.

FIG. 3 is a flow chart illustrating system operation.

DETAILED DESCRIPTION OF THE INVENTION

In prior art evaporative cooling systems, the cooling effect was generally limited to evaporation. In the present invention, three features combine to cool a structure. First, a polymeric sheet is used to provide some insulation for a roof or wall, thermally isolating the wall from the surrounding hot ambient air. Second, the color of the polymeric sheet may be selected to reflect solar energy, reducing the amount of light absorbed and converted to heat. These two features combine with the evaporative cooling feature to provide efficient cooling of a structure. The use of open cell construction in the polymeric sheet increases the surface area for evaporation compared to a roof or other building surface. The additional cooling features allow for lower water requirements to provide the cooling of the structure. Given that hot areas may also be dry areas, efficient use of water is important.

Prior systems generally feature fixed pipes. Such a system would remain in place year round. Such systems would not generally be adaptable for use on motor homes or other vehicles. In contrast, the present system could be easily adapted as a removable, portable system.

With reference to FIG. 1, two walls and a roof section covered by polymeric material 12 of structure 20 are shown. Polymeric material 12 may be a polyurethane foam rubber sheet of open cell construction. It is preferred that this sheet of polymeric material be durable, all weather, fire resistant, and relatively light weight. The open cells of the material provide an insulating effect as well as holding a small amount of water. Water would be drawn by hydrostatic forces through this top layer, providing an efficient water distribution across the building surface. The sheet may be affixed permanently to a roof or other building surface, for instance by an epoxy that would allow efficient heat transfer from the roof to the sheet. Alternatively, the sheet could be removable. A removable sheet would have the advantage of being able to be taken off the structure during colder weather when evaporative cooling is not required. This would prevent problems with water freezing in the pipes of the system. Such a removable sheet would also have a longer lifespan.

Sheet 12 has flaps 14 may be lowered over windows 22 on structure 20. These flaps allow covering the window during direct sun light exposure preventing greenhouse-type heating of the building interior. The cooling system includes a water supply line or pipe 30 which flows into a water conditioner. The water condition may include a stainless steel mesh screen able to filter course particulates from the water supplied to the evaporative cooling system. The water conditioner also may be a water softener to reduce mineralization of water flowing through the system. Water flows from water conditioner 32 to pipe 34 and into pump 36. Pump 36 may be used to increase the water pressure to the system to ensure proper flow. A regulator or pressure gauge may be used in conjunction with pump 36 to measure water pressure. Alternatively, the supply system pressure could supply water to the distribution system at sufficient pressure such that an additional pump is not required.

Water is pumped by pump 36 into pipe 35. Flow of water through pipe 35 is regulated by solenoid valve 38. Solenoid valve 38 is an all-weather electronically actuated valve. The valve may be of brass body construction and operate on direct current. This may be supplied by batteries or by an alternating current power supply wired into the structure's electrical system. Power from an A.C. supply would flow through a transformer that would step the power down to the solenoid's operating voltage and convert the current to D.C. The solenoid (and battery source if used) would be contained in a water-tight housing. Water flowing through valve 38 flows into supply tubes 40 running up the sides and along the roof line of structure 20. Supply tube 40 has a plurality of drip tubes 42 extending from it. Drip tubes 42 extend along the length of polymeric sheet 12. Water introduced into these tubes drip out of holes periodically positioned along the length of drip tubes 42. Liquid may then drip from the lengths of drip tube 42 and along the length of sheet 12. In the alternative, a spray or mist device may be used. A number of spray nozzles are commercially available. However, given that sprayers would lead to a less even application of water on the surface than a drip tube system and could be subject to clogging and loss of water in windy conditions, a drip tube system may be preferred. The sheet of polymeric material 12 may be adapted to aid in the distribution of water across the sheet by including a series of groove or a water conductive layer across the top of polymeric material 12. In other implementations, the top layer of the polymeric sheet could be absorbent, drawing water evenly across the sheet by hydrostatic forces.

Material 12 may include additional features to enhance building cooling. The color of polymeric sheet 12 that is exposed to sun rays should be light reflective. This time means that the sheet would reflect more solar radiation than the roof without the sheet reflects. A white colored sheet would be suitable. Alternatively a thin layer of porous Mylar® or another reflective metallic material could be used.

As illustrated, the polymeric sheet 12 covers both the roof and sides of structure 20. The polymeric material 12 may be used to provide an application of water onto selected surfaces of a structure. The surfaces receiving direct sun light during the day may be covered by the material sheets. These surfaces would ordinarily be heated by impinging sun light with resulting heat transferred to the interior of the building. The combination of light reflection, evaporative cooling, and insulation provided by the sheets combine to effectively provide a method to prevent both ambient heat and solar radiation from transferring into a building.

A sensor 50 may be found at least one location on the polymeric sheet 12. Sensor 50 detects an environmental condition. For example, sensor 50 may be a temperature sensor placed on or under polymeric sheet 12. In either location, the sensor would be considered proximate to polymeric sheet 12. Such a temperature sensor could sense roof temperature or the temperature of polymeric sheet 12 just below the surface at a location facing solar radiation. It is preferred that this sensor be all-weather rated and a solid state device. Alternatively, environmental sensor 50 could be a moisture sensor measuring moisture within polymeric sheet 12. Such a moisture sensor would be remote from the water dispensing means such as drip tube 42. In its simplest form, such a sensor could be a pair of wires just below the surface of polymeric material 12, the wires would be separated by some of the polymeric material. When water flows between the wires the water acts as a conductor, closing the circuit and allowing the signal to be sent to activate solenoid valve 38. Environmental sensor 50 is joined by wire 52 to system controller 54. System controller 54 actuates valve 38 in response to the signal from sensor 50 activating water flow through the system.

The system controller may include a manual activation switch, allowing a user to simply activate the system. The system control also has an on/off switch for the system. The system control includes a temperature or moisture comparator and a system activation setting either provided automatically or set by a user to select a sensor level at which the system is activated and deactivated. This would keep the temperature of the sheet within a selected range. The system control could also include a timer to switch the solenoid on for selected intervals. This interval activation could mitigate over wetting of the sheet. The system control could also include reset to default settings.

A number of different means may be used to secure the sheets to the side of a structure. For example, hooks or clamps on the side of the material may be used to affix the material to a structure such that it does not blow off the structure. Alternatively, lateral and transverse cables extending across the length and width of the material may be used to secure the sheets of polymeric material to the structure. It is also possible to use a backing on the polymeric sheet that is in contact with the exterior surface of the structure. The polymeric sheet may have a structure which allows the polymeric sheet to be affixed to the structure and provides the polymeric sheet with additional rigidity. Such a backing could be a plastic or metal mesh. It is also possible to permanently affix the sheet to a building using an epoxy such that edges of the material could not be lifted by wind. In another implementation, the sheets of polymeric material could be attached to the structure as a continuous sheet. A corner seam could be covered with an affixing tape. In this way the sheet could be continuous over areas of the building such that it is unlikely blow off.

With respect to FIG. 2, the cross section indicated by arrow A on FIG. 1 of the polymeric sheet shows polymeric sheet 12 having drip tubes 42. In this view, the drip tubes 42 are integral with polymeric sheet 12. Drip tubes 42 have an emitter 41 extending from the drip tube. Emitter 41 may simply be small holes periodically disposed along the length of drip tube 42. This allows wetting of sheet 12 and evaporative cooling. In this view, polymeric sheet 12 is shown having a backing 41. Backing 41 may be a plastic mesh that is secured to a structure to keep polymeric sheet 12 in place on the structure. Temperature sensors 50a, 50b are shown in two alternate locations. A system may use either or both sensor 50a or 50b for sensing the temperature. The top sensor 50a would sense temperature just below the surface of polymeric sheet 12. The bottom sensor 50b would sense the temperature approximate to the roof of a structure. Such a sensor could be affixed to the roof and the polymeric sheet positioned over the sensor.

The operation of the system is illustrated by FIG. 3. A water supply 60 would direct a supply of water to a water conditioner 62. Water directed through the conditioner 62 would have particulate matter removed. Water passing through conditioner 62 flows to a control valve 64. A sensor 70 proximate to the polymeric sheet would send a signal to the control systems 68. The control system would then send a signal activating a control valve 64. This would then allow water to flow to the distribution system 72, providing water flow across the evaporative cooling polymeric sheet. A manual activator 66 may also be used to signal the system control to open valve 64 and allow water to flow to distribution system 72.

The current system allows efficient cooling of a structure. In addition, in instances of fire hazards the system could wet the roof and walls of the structure reducing risk of fire damage. The polymeric sheet would be fire retardant and water flow to the roof and sides of the structure would inhibit the fire spreading to the building. Such a system could be simply retrofitted on building having a number of different roof types including wood shingle roof buildings.

What is claimed is:

1. A system for cooling a structure comprising:
   a removable polymeric sheet for covering an exterior surface of a structure;
   a water distribution system integral with said polymeric sheet, said water distribution system allowing wetting of a surface of said sheet;
   a water supply pipe providing water to said water distribution system;
   a valve regulating water flow through said water supply tube;
   a sensor proximate to said polymeric sheet sensing an environmental parameter; and
   a control system that receives a signal from said sensor, wherein said control system may actuate said valve.

2. The system of claim 1, wherein said water distribution system is a network of drip tubes extending through said polymeric sheet.

3. The system of claim 1, wherein said polymeric sheet of material has a first side that contacts a structure surface and a second side that is exposed, wherein the second side is light reflective.

4. The system of claim 3, wherein said light reflective surface is white.

5. The system of claim 3, wherein said light reflective surface is mylar.

6. The system of claim 1, wherein said sensor is a temperature sensor.

7. The system of claim 1, further including a means for securing the polymeric sheet of material to the structure surface.

8. The system of claim 7, wherein said means for securing the polymeric sheet of material is a network of lateral and transverse cables.

9. The system of claim 7, wherein said means for securing the polymeric sheet of material is a support mesh affixed to a side of said material that contacts the structure surface.

10. The system of claim 1 further including a water conditioner connected between the water distribution system and the water supply tube.

11. The system of claim 10, wherein said water conditioner is a water softener.

12. A system for cooling a structure comprising:
    a removable polymeric sheet covering an area of an exterior surface of the structure;
    a water distribution means integral with said means for covering an area of an exterior surface, said water distribution means in fluid communication with a water source;
    a valve regulating water flow to said water distribution means;
    a sensor proximate to said means for covering an area of an exterior surface, said sensor measuring an environmental parameter; and
    a control means electronically linked to said sensor such that when said sensor detects a specified environmental condition, said valve may be activated, providing water distribution across the means for covering the area of the exterior surface of the structure.

13. The system of claim 12, wherein said water distribution means is a plurality of drip tubes extending through the polymeric sheet.

14. The system of claim 12, wherein said polymeric sheet of material has a first side that contacts a structure surface and a second side that is exposed, wherein the second side is light reflective.

15. The system of claim 12, wherein said sensor means is selected from a group consisting of a temperature sensor and a moisture sensor.

16. The system of claim 12, further securing the polymeric sheet to a structure.

17. The system of claim 12, further including a water conditioner connected to filter water introduced into the water distribution means.

* * * * *